June 25, 1929.  J. A. DIRSCHAUER  1,718,541
ROTARY SOIL CUTTER
Filed June 14, 1927

Inventor,
Jacob August Dirschauer
By                              Atty.

Patented June 25, 1929.

1,718,541

UNITED STATES PATENT OFFICE.

JACOB AUGUST DIRSCHAUER, OF EVANSVILLE, INDIANA.

ROTARY SOIL CUTTER.

Application filed June 14, 1927. Serial No. 198,848.

This invention relates to a rotary soil cutter of that general class having teeth and adapted for use on any agricultural machine, preferably in connection with a gang of cutters which are adapted to be rotated at high speed, the purpose being to cut up roots, heavy grass roots, and small wooden objects in or on the soil being treated.

My objects are, first, to provide a rotary soil cutter of stamped, unitary construction having individual teeth of improved elongated, narrow, and tapering form which, collectively, will constitute two sets of teeth diverging from each other toward opposite sides of the plane of the cutter so that the pressure will be equalized or balanced when the cutter is in use, enabling the cutter to operate through any distance that it may be set or arranged to travel when it is vibrating and, further, to enhance the cutting effect; second, to provide a polygonal hole in the center of the cutter to enable it to be secured on the mandrel and to permit the reversal of the cutter for further use when the teeth or cutters on one side become worn more than on the other side, thus lengthening the life of the cutter; third, to provide the central portion of the cutter with a slight crown on each side of the teeth up to near the mandrel hole to add strength.

The foregoing objects are accomplished by the provision of an improved cutter having a construction hereinafter described and which is shown in the accompanying drawings in which.

The cutter is shown at 1 and it is provided with a polygonal hole 2 which is preferably square to fit a square mandrel. This polygonal hole insures that the cutter be tightly held on the mandrel so that it cannot slip and also enables it to be reversed so that it may be used again, when the teeth have been worn, thereby to present the unworn teeth for further use.

Figure 1:
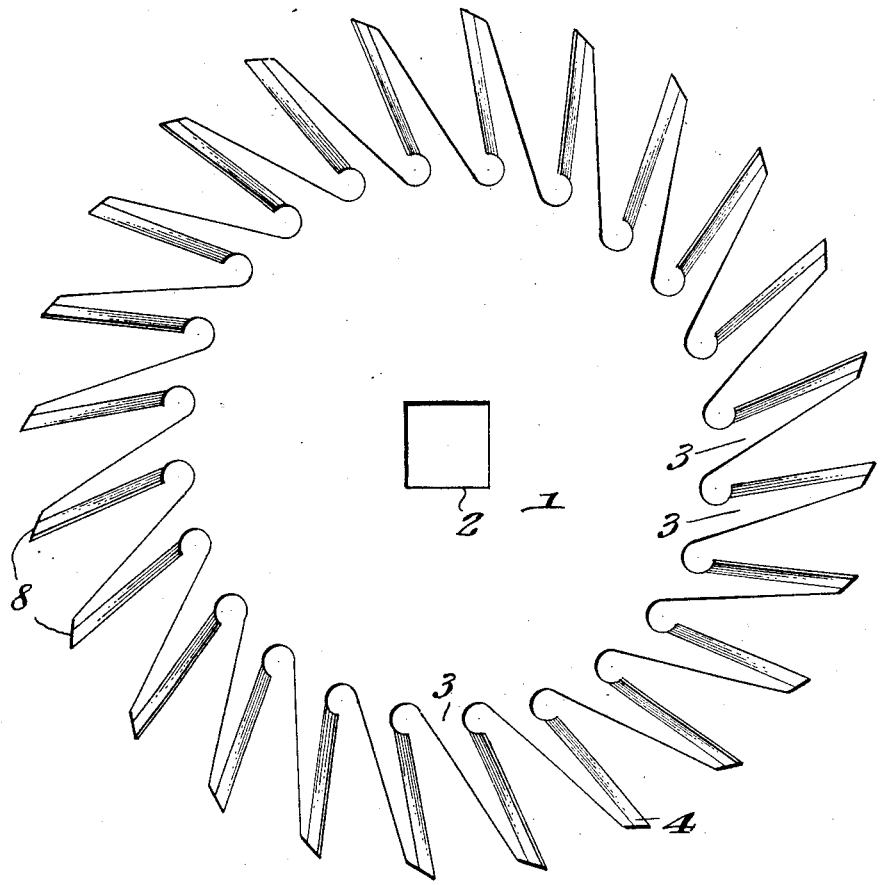
Figure 1, is a side elevation.
Figure 2:
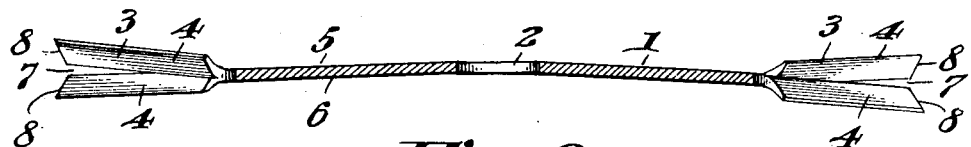
Fig. 2, is a transverse section.

The teeth appear at 3, each tooth being long and narrow and having a bevelled or shear edge 4 extending from its top to a point near its base but terminating at an enlargement or cut-out thereat, which renders the teeth self-clearing. In alternation, the teeth extend toward the opposite sides or faces of the cutter which is shown in Fig. 2 so that one set of teeth, comprising alternate teeth, will be inclined toward the side 5 of the cutter 1, and the remaining teeth inclined toward the opposite side 6 of the cutter. The effect is that there are two rows of teeth, each having its shear or bevel edge 4, which diverge as shown at 7, Fig. 2. The teeth have their ends bevelled as shown at 8 in such manner that they diverge.

The construction provided causes a balancing of the pressure when the cutter is at work so that there is no tendency for the cutter to "dish" or to flex and the cutting capacity is greatly increased regardless of the extent of movement of the cutter when carried by an agricultural machine and put to work.

The cutter is intended to be revolved at high speed, the long teeth readily severing and tearing up small roots, heavy grass roots, small wooden objects and other severable objects in or on the soil being treated.

My cutter is particularly adapted for use in a gang of cutters revolving at high speed and it may be used on any agricultural machine.

What I claim is:

1. A rotary soil cutter having similar narrow, elongated peripherally arranged cutting teeth each provided on the same side with a shear cutting edge, alternate ones of said teeth extending at an inclination to the plane of the body of the cutter in a direction opposite to that of the adjoining tooth, thereby providing a double row of cutting teeth diverging from each other.

2. A stamped, integral rotary soil cutter having a body from whose periphery project similar, narrow, elongated peripherally arranged cutting teeth each provided on the same side with a shear cutting edge, alternate ones of said teeth extending at an inclination to the plane of the body of the cutter in a direction opposite to that of the adjoining tooth, thereby providing a double row of cutting teeth diverging from each other.

3. A stamped, integral rotary soil cutter having a body from whose periphery project similar, narrow, elongated peripherally arranged cutting teeth each provided on the same side with a shear cutting edge, alternate ones of said teeth extending at an inclination to the plane of the body of the cutter in a direction opposite to that of the adjoining tooth, thereby providing a double row of cutting teeth diverging from each other, the central part of said body being crowned and provided with a polygonal hole to fit a mandrel.

In testimony whereof I affix my signature.

JACOB AUGUST DIRSCHAUER.